Patented Jan. 4, 1949

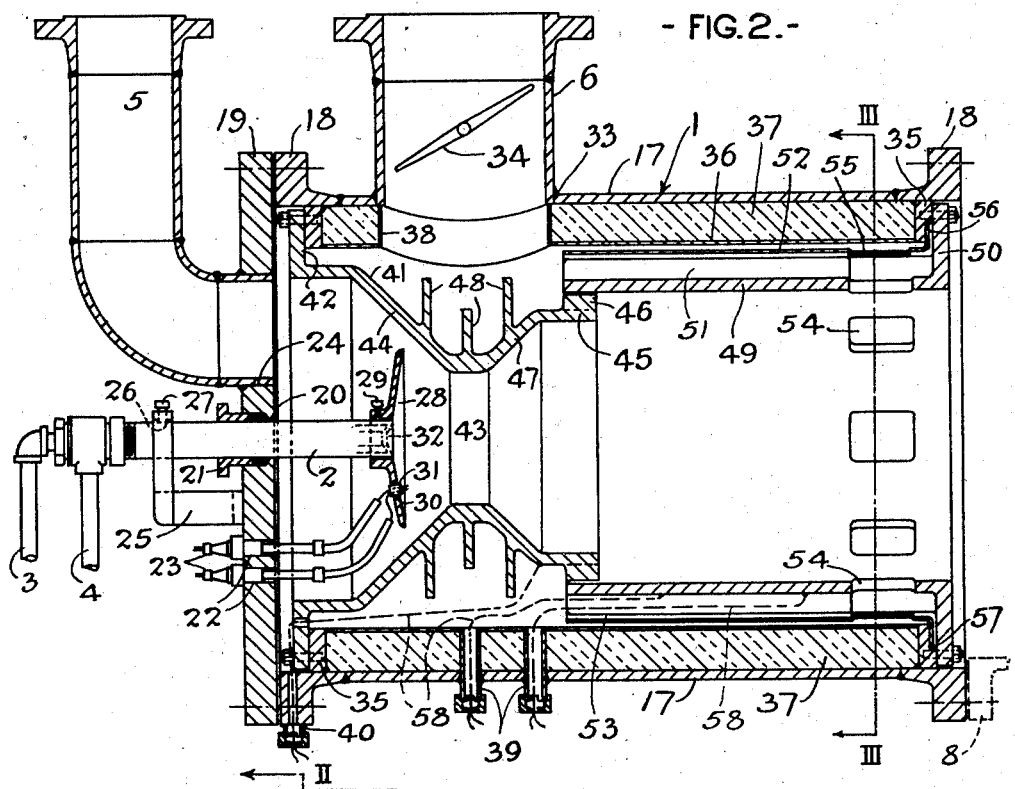

2,458,066

UNITED STATES PATENT OFFICE 2,458,066

COMBUSTION CHAMBER

George B. Farkas, Jackson Heights, and Addison Y. Gunter, Larchmont, N. Y., assignors to American Locomotive Company, New York, N. Y., a corporation of New York Application July 20, 1944, Serial No. 545,831

5 Claims. (Cl. 263—19)

1

This invention relates to a combustion chamber for producing hot flue gas.

The object of the present invention is to provide an improved combustion chamber for producing hot gas, for instance gas for driving a gas turbine, or for use in heating and drying processes.

The combustion chamber of the present invention is for producing a hot gas. The produced gas may be used for a large variety of purposes and in many different kinds of equipment. It is especially suitable, when produced under pressure, for driving a gas turbine, and the following description, by way of example, will be of the combustion chamber employed in a gas turbine power plant.

Referring to the drawing forming a part of this application, Figure 1 is a diagrammatic view of a power plant employing the combustion chamber of the present invention; Fig. 2 is a section, on the line II—II of Fig. 3, of the combustion chamber, parts being shown in full and parts being broken away, a pipe being indicated fragmentally in dot-dash lines; and Fig. 3 is, at the right, an end view taken from the right of, and at the left a section on the line III—III of, Fig. 2.

The power plant shown in Fig. 1 includes a combustion chamber 1, constructed in accordance with this invention, and later to be more fully described. A fuel oil and air mixture under pressure is delivered to the combustion chamber through a pipe 2 which has connected thereto a fuel oil pipe 3 and a pipe 4 for air under pressure. Air under pressure is also delivered to the combustion chamber at two points through branches 5 and 6 of a pipe 7, this air acting both to aid combustion and to cool parts of the combustion chamber, this air concurrently to be heated thereby for added power fluid. Gas (hot products of combustion and air) formed in the combustion chamber is delivered through a pipe 8 to the inlet end of a gas turbine 9 driving an air compressor 10. It is contemplated that the combustion chamber may deliver, for example, 30,000 pounds of gas per hour, the gas being at 73 pounds pressure and at 1500 degrees Fahrenheit.

The exhaust from turbine 9 is delivered by a pipe 11 through a heat exchanger 12. Atmospheric air is drawn in by compressor 10 through a pipe 13 and is delivered therefrom under pressure by a pipe 14 through the heat exchanger 12, where it is initially heated, and therefrom through the pipe 7 and branches 5 and 6 to the combustion chamber. It is contemplated that

2 the air may be delivered to the branches 5 and 6 at, for example, 73 pounds pressure and at 716 degrees Fahrenheit. Pipe 4 is connected to a booster 15 which is connected by a pipe 16 to pipe 7 for supply of air to the booster, the booster increasing the pressure of the air to, for example, about 83 pounds as it enters the pipe 2. The pressure, temperature and quantity of gas, and the pressures and temperatures of the air given above are by way of example only. The various pipes and equipment through which hot gas and hot air pass will be insulated to prevent loss of heat.

The combustion chamber is shown in detail in Figs. 2 and 3. It includes a thin-walled cylindrical casing 17 having a bolting flange 18 at each end, the flange 18 at the rear end being for connection with pipe 8 (Fig. 1), and the flange 18 at the other end being bolted to a head 19. The head has a central orifice 20 in which is slidably disposed pipe 2, pipe 2 being sealed to the head against leakage of air by a gland 21. Below orifice 20 are two vertically aligned orifices 22 in which are disposed electrodes 23. A large orifice 24 is formed in the head above orifice 20 and a flanged elbow of pipe 5 is secured therein by welding. Pipe 2 is supported on the outside of the head by a bracket 25 having an orifice 26 through which pipe 2 extends and a set screw 27 for locking pipe 2 against movement in orifice 26 after pipe 2 has been adjusted, as will presently appear. A burner shield 28 is removably secured to the inner end of pipe 2 by a set screw 29, the ends of the electrodes 23 extending through a hole 30 in the shield and being insulated from the shield by an insulating ring 31. A nozzle 32 is disposed in the inner end of the pipe 2 for spraying the mixture of fuel oil and air into the combustion chamber. Casing 17 is provided in its top with an orifice 33 in which is secured a nozzle of pipe 6 by welding, a butterfly valve 34 being provided therein.

An annular flange 35 is secured by welding in the casing a short distance inward from either end thereof. A retainer 36 for high temperature insulating material 37 is welded to the flanges, having a collar portion 38 in line with pipe 6. Two thermocouple connections 39 extend through the casing wall, insulation and retainer at the bottom of the casing and another thermocouple connection 40 is formed in the bottom of the forward flange 18.

A burner throat member 41 is disposed in the front portion of casing 17. It is provided with a flange 42 bolted to the forward flange 35, and a restricted throat 43 to the rear of the shield 28 and beneath the pipe 6, flange 42 and throat 43 being connected by a conical wall 44. The rear end of the member 41 includes a cylindrical wall 45 having eight peripheral external lugs 46. Wall 45 is connected to throat 43 by a conical wall 47. External transverse annular fins 48 are provided on throat 43 and on the adjacent portions of walls 44 and 47. A cylindrical liner 49 is disposed in the rear portion of casing 17. It has a rear flange 50 bolted to the rear flange 35. The rear lugged wall 45 of member 41 is disposed in the front end of liner 49. Liner 49 has external longitudinal fins 51.

Member 41 and liner 49, between flanges 42 and 50, are spaced from the surrounding retainer 36. A sleeve 52 is disposed between and spaced from liner 49 and retainer 36 and it has fins 53 interfitting in spaced relation between the fins 51. The liner 49 has a circular row of ports 54 at its rear end portion opening into the space between its outer face and the sleeve 52. Sleeve 52 has a row of ports 55 in line with ports 54 and a flange 56 at its rear end welded in a groove 57 in the rear face of the rear flange 35.

The operation of the combustion chamber is as follows:

Fuel oil and atomizing air compressed mixture is sprayed by the nozzle 32 into the throat 43 and is ignited by the electrodes 23. Primary combustion air under pressure flows through pipe 5 into the combustion chamber to the front of the shield 28. Wall 44 directs this air through the space between the shield 28 and the wall 44, mixing with the atomized fuel for supporting combustion thereof, the surplus air being heated and passing with the products of combustion through throat 43, the hot gas mixture flowing therefrom into the liner 49. Secondary air under pressure flows through pipe 6 past valve 34 into the space around the member 41. The temperature of member 41 is kept within safe limits by the air from pipe 5 flowing through it, and by the air from pipe 6 flowing around it, the fins 48 aiding in the cooling. The space around member 41 provides for good distribution of the air from pipe 6, this air being initially heated by the hot metal of member 41.

Air from around member 41 flows through the spaces between the sleeve 52 and liner 49 and between the sleeve 52 and the retainer 36. This air flows along fins 51 and 53. Fins 51 radiate some of their heat to fins 53. The temperature of liner 49 is kept within safe limits by this air flowing between the liner and sleeve and between the sleeve and the retainer. This air enters within liner 49 through ports 54 and 55, whereupon it mixes with the hot gases therein. Some air from pipe 6 also passes from around the member 41 through the spaces between the lugs 46 into the liner 49 and by travelling along the inner face of liner 49 aids in holding the temperature of the liner within safe limits. The entire products of combustion and heated air leave the combustion chamber through the rear end thereof into the pipe 8 leading to the turbine 9 (Fig. 1). The power gas for the turbine coming from the combustion chamber consists largely of air from pipes 5 and 6 heated by the burning mixture from pipe 2.

The air from pipe 6 entering the liner through ports 54 and through the spaces between the lugs 46 cools the hot gases entering the liner from the member 41 to a temperature suitable for use in the turbine. For instance, if the temperature of the burning gases in the member 41 is 2700 degrees Fahrenheit, the air entering liner 49 from pipe 6 reduces this temperature to about 1500 degrees Fahrenheit, which is a temperature which the turbine can withstand.

It is desirable to maintain a proper differential of pressure on opposite sides of the throat 43. This is accomplished by adjustment of the space between the shield 28 and the wall 44 in relation to the space between the valve 34 and the adjacent wall of the pipe 6. Once valve 34 and shield 28 have been adjusted properly, they are secured in this position and no further adjustment is normally necessary.

There is expansion and contraction relative movement between various of the parts of the combustion chamber. This is especially true of the member 41 and the liner 49, which are secured at their rear and front ends respectively to the casing, the inner ends of each being in slidable engagement by the disposition of the lugs 46 in the rear of the liner 49. Thus when such expansion and contraction relative movement takes place between the member 41 and the liner 49, lugs 46 slide in liner 49, providing a telescope connection between the two parts. Therefore both the member 41 and liner 49 are free of expansion and contraction stresses.

Thermocouple wires 58, indicated by dash lines in Fig. 2, pass through the thermocouple connections and are secured at points on the member 41 and liner 49 for employment in registering the temperatures these parts reach. Both the member 41 and liner 49 may be made of chrome nickel steel.

While there has been hereinbefore described an approved embodiment of this invention, it will be understood that many and various changes and modifications in form, arrangement of parts and details of construction may be made without departing from the spirit of the invention, and that all such changes and modifications as fall within the scope of the appended claims are contemplated as a part of this invention.

The invention claimed and desired to be secured by Letters Patent is:

1. A combustion chamber for producing a hot mixture of products of combustion and air comprising a casing; a hollow structure providing a combustion space, disposed within said casing having a closure and an inlet for air at its forward end, an outlet at its rear end, a wall secured at its forward end to said casing and extending rearwardly therefrom, converging from said inlet toward said outlet providing a contracted throat and extending rearwardly therebeyond, and another wall extending rearwardly from said throat-containing wall, said walls being adapted to expand and contract relative to said casing and providing with said casing a space forming a passage having an inlet for air at its forward end and an outlet at its rear end, said walls at their juncture having a row of ports providing another outlet for said passage, both said passage outlets opening into said combustion space; and a fuel burner having an outlet in front of and facing said throat.

2. A combustion chamber for producing a hot mixture of products of combustion and air comprising a casing; a hollow structure, providing a combustion space, disposed within said casing having a closure and an inlet for air at its forward end, an outlet at its rear end, a wall converging from said inlet toward said outlet providing a contracted throat and extending rearwardly therebeyond, and a wall connecting said throat-containing wall with said outlet, said walls being spaced from said casing; a wall intermediate said connecting wall and said casing forming therewith two passages having a common inlet for air at their forward ends and at their rear ends being in communication with said combustion space for flow of the passage air thereto; and a fuel burner having an outlet in front of and facing said throat.

3. A combustion chamber for producing a hot mixture of products of combustion and air comprising a casing; a hollow structure, providing a combustion space, disposed within said casing having a closure and an inlet for air at its forward end, an outlet at its rear end, a wall converging from said inlet toward said outlet providing a contracted throat and extending rearwardly therebeyond, and a wall connecting said throat-containing wall with said outlet, said walls being spaced from said casing; a wall intermediate said connecting wall and said casing forming therewith two passages having a common inlet for air at their forward ends and at their rear ends being in communication with said combustion space for flow of the passage air thereto, said intermediate and connecting walls having respectively interior and exterior longitudinal fins intermeshing in spaced relation to each other; and a fuel burner having an outlet in front of and facing said throat.

4. A combustion chamber comprising a casing having an outlet at its rear end; a head closing the forward end of said casing; a throat member in the forward portion of said casing having a rearwardly converging wall open at its rear end providing a throat; a liner member in the rear portion of said casing having its forward end adjacent said throat member, said members being spaced from the inner face of said casing; an inlet for air under pressure in said head opening into said throat member; a burner slidably mounted in said head having a shield adjustable relative to said converging wall for regulating the passage of said air to said throat; an inlet in said casing for cooling air under pressure opening into the space between said members and said casing around said throat; ports in one of said members permitting passage of said cooling air into said liner member; and an adjustable valve in said cooling air inlet, whereby, by adjustment of said shield and said valve, a differential of air pressures on opposite sides of said throat may be obtained.

5. A combustion chamber for producing a hot mixture of products of combustion and air comprising an outer casing, an inner casing, said casings being closed at their forward ends and said inner casing being open at its rear end, said casings being spaced from each other providing an air passage closed at its opposite ends, said inner casing having a forward portion converging rearwardly forming a throat; a fuel burner having an outlet in front of and facing said throat; and separate air inlets, one opening into said inner casing forward of said burner for supporting combustion of said fuel, said inner casing further having a portion for said mixture rearward of said throat having openings at its forward and rear end portions to said passage, the other of said air inlets opening to said passage at the forward end portion thereof for flow of air therefrom to said passage and therefrom into said inner casing mixing portion through its said openings, said inner casing between its said openings being imperforate and said inner casing forward of said forward opening being imperforate providing of said passage air a cooling jacket for said inner casing.

GEORGE B. FARKAS.
ADDISON Y. GUNTER.

REFERENCES CITED

The following references are of record in the file of this patent:

UNITED STATES PATENTS

| Number | Name | Date |
| --- | --- | --- |
| 1,378,248 | Lindsay | May 17, 1921 |
| 1,827,246 | Lorenzen | Oct. 13, 1931 |
| 2,000,733 | Avery | May 7, 1935 |
| 2,066,788 | Lysholm | Jan. 5, 1937 |
| 2,110,209 | Engels | Mar. 8, 1938 |
| 2,195,025 | Corizinet | Mar. 26, 1940 |
| 2,249,489 | Noack | July 15, 1941 |
| 2,268,464 | Seippel | Dec. 30, 1941 |